Dec. 13, 1938.    P. T. FARNSWORTH    2,140,284
PROJECTING OSCILLIGHT
Filed July 14, 1931
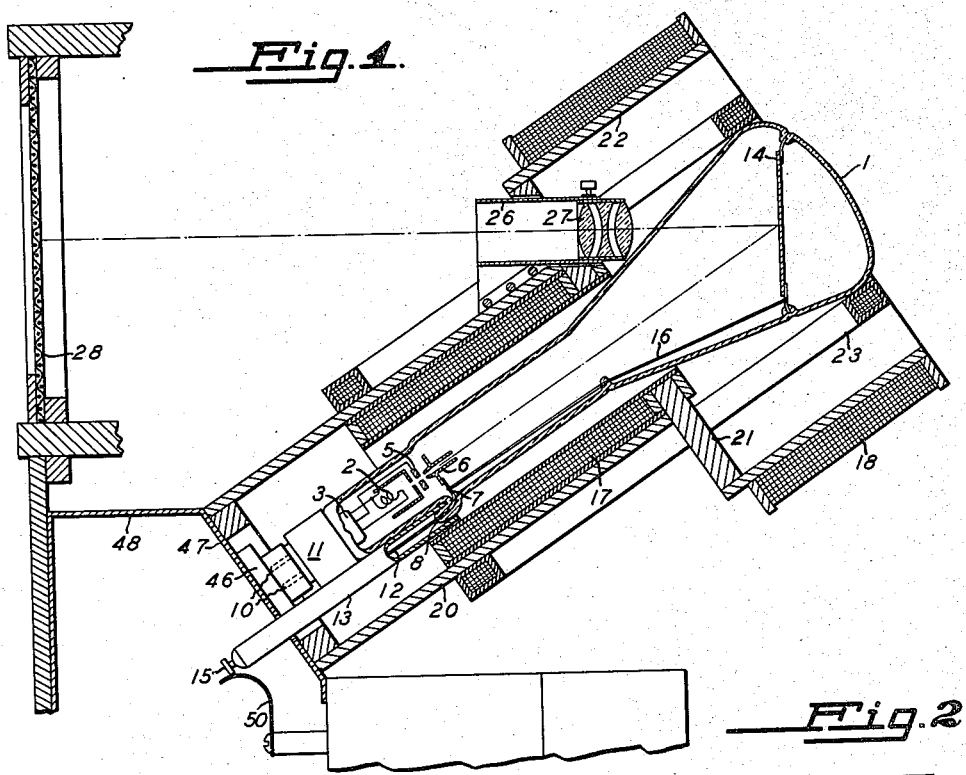
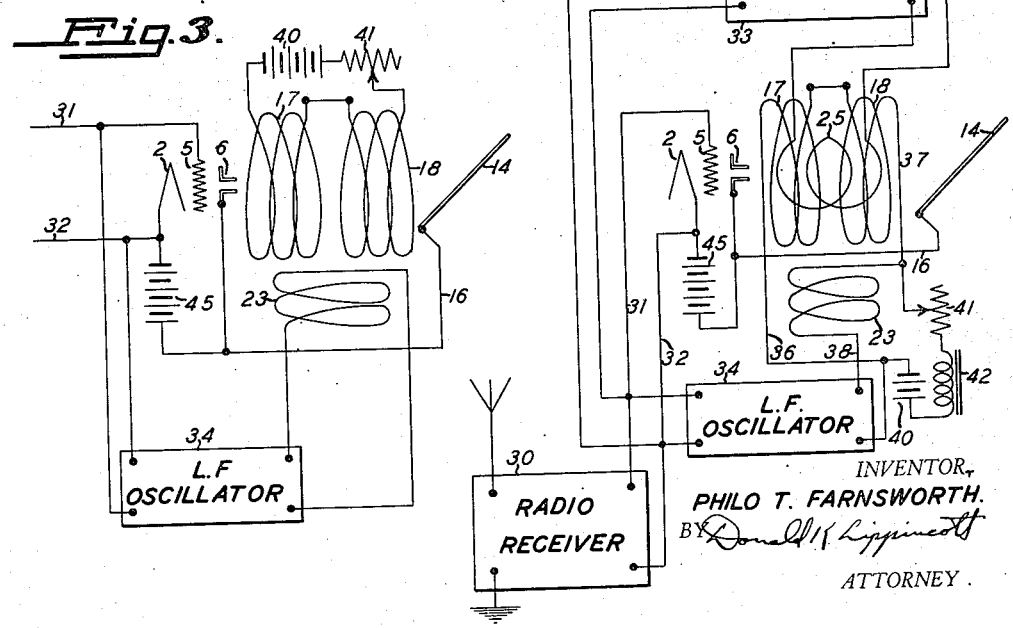
INVENTOR,
PHILO T. FARNSWORTH.
BY
ATTORNEY.

Patented Dec. 13, 1938

2,140,284

UNITED STATES PATENT OFFICE 2,140,284

PROJECTING OSCILLIGHT

Philo T. Farnsworth, San Francisco, Calif., assignor to Farnsworth Television Incorporated, a corporation of California Application July 14, 1931, Serial No. 550,653

15 Claims. (Cl. 178—7.5)

This invention relates to oscillights or cathode ray tubes adapted for the electrical transmission of pictures, and particularly to receiving tubes for providing an image having sufficient brightness, detail, and flatness of field, to permit the received image to be projected optically upon a suitable screen.

Among the objects of my invention are: to provide an oscillight having a screen which is optically flat; to provide a means for protecting an optical image of the bombarded side of an oscillight screen; to provide a means whereby a projecting lens system may be introduced through a system of focusing coils; to provide an oscillight having a screen disposed at an angle to the axis of the oscillight, so that the means for generating the beam of cathode rays does not interfere with the production of an optical image of the screen; and, in furtherance of the above objects, to provide a method of varying the position of the magnetic focus of a stream of cathode rays, so that the plane of the oblique screen coincides with the focal plane of the rays.

Other objects of my invention will be apparent or will be specifically pointed out in the description forming a part of this specification, but I do not limit myself to the embodiment of my invention herein described, as various forms may be adopted within the scope of the claims.

Referring to the drawing:—

Figure 1 is a vertical sectional view taken through the axis of the oscillight and its accompanying focusing coils and optical system.

Figure 2 is a schematic diagram of the electrical circuits utilized in connection with the oscillight, to provide the objects and advantages above stated.

Figure 3 is a similar diagram showing a modified circuit arrangement.

The use of cathode ray apparatus for receiving electrically transmitted pictures has the obvious advantages that no moving parts are required in order to scan the picture field, and that the control of the brilliancy of the various picture elements and the scanning are both included in a relatively simple and cheap piece of equipment. The disadvantage of this receiving means has in the past been that the size of the fluorescent screen upon which the picture is produced has been limited, the brilliancy of the received image has been insufficient to permit of its optical protection, the picture field has been curved, instead of being substantially plane, and, although the electrical image was capable of being focused magnetically, this focus was strictly accurate only at the center of the field, and distortions were produced adjacent the edges of said field. These distortions, although not greatly in excess of those ordinarily permitted in optical systems, have none the less been a disadvantage which it has been thought desirable to overcome.

One of the physical causes for lack of brilliancy in the fluorescent screen has been that this screen has been viewed from its reverse side, i. e., the side opposite to that which is bombarded by the cathode rays. The fluorescent materials used have been zinc sulphide, calcium tungstate, or other of the well known fluorescent materials. Such materials are ordinarily opaque, white, insoluble salts. The materials have been deposited on glass, usually the end of the cathode ray tube itself, and the image has been viewed through the glass. Since the fluorescent material glows more brightly upon the bombarded side, and since considerable absorption of light takes place through the material, only from one-half to one-fifth of the available light of the screen has been utilized.

Furthermore, the necessity of depositing the screen upon a transparent surface has prevented the utilization of a conducting back for the screen. The cathode ray which bombards the screen consists of negative charges of electricity, and these charges are prevented from escaping, or at least greatly retarded, by the insulating nature of the screen. The result has been that there is a tendency for a large negative charge to gather upon the screen, which slows down the approaching electrons, decreasing their velocity of impact, and hence the brilliancy of the screen. Where the electron beam bombarded the screen with sufficient velocity to knock out secondary electrons, the charge collecting upon the screen becomes, of course, positive, with the result that this slowing down of electrons disappears. This has been the normal operative condition of tubes of this character, but it has at times been difficult to achieve sufficiently severe bombardment of the screen to produce this positive charge, with the result that large areas, upon which no picture was formed, would at times persist for considerable periods after the operation of the device was started.

Obviously, the above numerated disadvantages would disappear if the screen could be viewed from its bombarded side. This has not been practical, owing to the presence of the "electron gun" which generates the beam of rays, and which, lying directly in the line of sight of the would-be observer, occulted a large portion of the screen.

My invention comprises an oscillight tube including the usual cathode ray source. Mounted in the ends of the tube, and facing the source of cathode rays, is a fluorescent screen formed upon a backing of conducting material, preferably sheet metal. The screen is mounted obliquely with regard to the axis of the tube as defined by the normal or undeflected path of the cathode rays. Means are provided for focusing the cathode ray beam, these means preferably comprising a plurality of coils, or solenoids, preferably of different diameters, and mounted coaxially with the oscillight. The adjacent ends of the coil are preferably approximately co-planar, and an optical system, for projecting an image of the fluorescent screen, is inserted in the annular space between the coils.

Suitable means for deflecting the beam of rays are also provided, preferably comprising coil systems for producing magnetic fields transverse to the axis of the tube and mutually perpendicular. The beam or pencil of cathode rays is focused by the resultant magnetic field from the various sets of coils, the rays traversing spiral paths which are tangent to the "line of force" through their source at a distance which is inversely proportional to the strength of the field. The major focusing effect is derived from a constant current component in the longitudinal coils while the deflection is produced from an alternating component in the transverse coils. If the coils carry only the above mentioned components the resultant field varies in intensity on both sides of its undeflected position, the stronger field which occurs when the beam is deflected bringing the focal point nearer the source and forming an approximately spherical focal surface, but by introducing a component of opposite type in either or both of the sets of coils (i. e., A. C. in the longitudinal coils, D. C. in the transverse,) the resultant field may be made to change in strength concurrently with its change in direction, so that the focal surface can not only be made substantially plane, but also may be tilted with respect to the axis of the tube, coinciding with the oblique screen. The projecting system can then be mounted with its axis perpendicular to the screen, and an optical image of relatively large size and high brilliancy can be formed.

Describing in detail a preferred form of my invention, the oscillight comprises the usual envelope 1, within the tubular end of which is mounted an electron gun for projecting a modulated stream of cathode rays. The gun comprises a shielded cathode 2, mounted upon a stem or press 3, and preferably of the type described in my copending application Serial No. 461,111 filed June 14, 1930. Also mounted on the stem, and coaxial with the cathode, is an annular control electrode or grid 5.

The anode 6 of the oscillight is shown as mounted upon a conducting side support 7, its connection being sealed in through a side tube 8. This construction is adopted in order to facilitate insulation and shielding of the anode lead, since high potentials, of the order of 10,000 volts, are preferably used in this apparatus.

The filament and control electrode leads are brought out to contact pins 10 in the radio-tube-type base 11. The anode lead 12 is preferably mounted within and insulated from the metallic shield 13, and terminates in a contact 15.

When the filament is heated and a suitable high potential applied to the anode, a stream of cathode rays is generated which passes through the perforation in the anode, passing through the tube and impinging upon the fluorescent screen 14, in the well-known manner.

The screen 14 differs from the usual construction in that it is mounted within the tube obliquely with reference to the axis of the tube as defined by the electron gun structure, and is opaque, preferably being formed of thin sheet metal with a suitable fluorescent material deposited upon its bombarded side. A conductor 16 preferably connects the screen to the anode 6. This conductor carries off charges which would otherwise be accumulated by the screen from the electron stream, and assures that the beam of cathode rays within the tube will travel the full length at substantially constant velocity, instead of being repelled and therefore slowed by negative charges which might otherwise accumulate upon the screen, or else attracted and speeded by positive charges derived through the loss of secondary electrons from the bombarded screen. The use of a conducting screen greatly increases the stability of the device, and renders the focus of the beam of cathode rays much more definite and satisfactory.

The tube is surrounded by a coil system adapted to produce a substantially uniform longitudinal field throughout the tube. This system comprises a cylindrical solenoid 17 surrounding the tubular portion of the oscillight between the electron gun and the flaring portion of the tube, and a larger solenoid 18 surrounding the coaxial with the remainder of the tube so as to include substantially all of the screen 14. The coil 17 is preferably protected by a tube of Bakelite or other insulating material 20. At the end of the insulating tube 20 is an insulating frame 21 carrying a larger insulating tube 22 upon which the coil 18 is mounted. The ends of the coils 17 and 18 are substantially co-planar, but it will be noted in the figure that this co-planarity is not exact, the exact position of the coil to produce a uniform field being found by experiment. Satisfactory results can be obtained with the ends of the coil in exactly the same plane, but a slight adjustment one way or the other, depending upon the relative diameters of the two coils, will usually produce a slight improvement in results.

A second system of coils for producing transverse magnetic fields also surrounds the tube. This system comprises a pair of coils 23 mounted in planes substantially perpendicular to the plane of the figure and parallel to the axis of the tube, and a second pair of coils 25 lying in planes parallel to the plane of the figure and the axis of the tube. The coils of this second system preferably lie outside of the coil 17 and within the coil 18, passing through notches (not shown) formed in the frame 21 to permit their passage.

The frame 21 also supports a tube or lens mounting 26 which holds a suitable projecting lens 27. The axis of the lens mounting 26 is perpendicular to the screen 14, and permits the projection of an image of the screen 14 upon a projection sheet or screen 28.

The connections of the apparatus as thus described are shown in Figure 2. Television signals may be received by wire, or picked up by the radio receiver 30 as shown. These signals, detected and amplified in the usual manner, are supplied through the leads 31 and 32 to the various elements of the scanning and receiving system. The lead 31 connects to the grid or control element 5 of the oscillight. The lead 32 connects with the filament 2. A high frequency oscillator 33 and a low frequency oscillator 34, each preferably producing currents of saw-tooth wave form, are also connected across leads 31 and 32 as is described in my copending application, Serial No. 449,984, filed May 5, 1930.

The received signals comprise television impulses interspersed with synchronizing pulses for holding oscillators 33 and 34 in step. The low frequency oscillator preferably produces currents at a frequency of from 16 to 24 cycles per second. This is the low or picture frequency scanning current. The high frequency oscillator operates at a frequency depending upon the number of lines of the picture to be reproduced, usually somewhere between 2000 and 6000 cycles per second. The output of the high frequency oscillator feeds the coil 25 (shown in the schematic diagram as a single coil) to produce transverse scanning of the picture.

The output circuit of the oscillator 34 may be traced through the lead 36, the coils 17 and 18, lead 37, coils 23, and through lead 38 back to the oscillator. The focusing coils 17 and 18 also carry a direct current component supplied from a suitable source 40, through an adjustable resistor 41 and a coke 42 which prevents the short circuiting of the oscillator current, and thence through coils 17 and 18 and lead 36 back to the source 40. The voltage of the source 40 and the resistance of the rheostat 41 are so chosen that the component of the longitudinal magnetic field produced by coils 17 and 18 is relatively strong as compared with the alternating component supplied by the oscillator through the same coils. Moreover, as regards the alternating magnetic fields, that produced by the coils 23, is somewhat stronger than that produced by coils 17 and 18.

For the tube shown in the diagram, the anode voltage being constant, and the longitudinal magnetic field required to focus the undeflected beam being taken as 100%, the alternating component superposed thereon has a magnitude of $\pm 8.25\%$ and the transverse field a magnitude of $\pm 12.7\%$, the figures representing crest values and the character $\pm$ indicating the alternating nature of the field.

The operation of the apparatus is as follows: The hot cathode 2 of the oscillight comprises a source of electrons which are accelerated towards anode 6 by the voltage of a suitable high potential source 45, preferably of the order of 10,000 volts. A large proportion of the electrons pass through the perforation in the anode to form a beam of cathode rays which, in the absence of deflecting currents in the coils 23 and 25, start axially down the tube to strike the screen 14 and excite it to fluorescence. The beam or pencil of cathode rays when generated will normally be somewhat divergent, the trace of the rays on the screen being materially larger in diameter than the aperture in the anode.

When a current is passed through the coils 17 and 18, established a magnetic field longitudinal to the path of the rays, the electrons comprising the divergent portion of the beam are deflected from their normal rectilinear paths into spiral paths, each of these spirals being tangent to the magnetic line of force through the electron source, which may be taken in the present case as the opening in the anode. As has been shown in my copending applications Serial No. 270,673, filed April 17, 1928, and Serial No. 461,111, above mentioned, the pitch of these spiral paths will be the same for all electrons, regardless of their divergence, and their points of tangency with the lines of force through their source will all occur at the same distance from the source. This distance is inversely proportional to the strength of the longitudinal magnetic field and is directly proportional to the velocity of the electrons.

If the screen 14 and the anode 6 are electrically connected, there is a substantially equi-potential space formed between them, through which the electrons travel at a substantially constant velocity, irrespective of their deflection by the field due to the coils 23 and 25. As the rays are deflected by the coil 23, the length of their path between the anode and the screen changes due to the obliquity of the screen. The amount of the deflection of the path at any instant depends upon the current flowing at that instant in the coil 23, but since this same current also flows through the focusing coils 17 and 18 the strength of the focusing field, and hence the focal distance of the rays, changes in consonance with the deflection. By properly adjusting the ratio between anode voltage, the constant current component of the focusing field, and the deflecting current, the plane of focus of the electrons may be made to coincide almost exactly with the plane of the screen 14. It is to be noted that, in order to accomplish this, the direct and alternating components through the focusing coil must be in the same sense when the beam of rays is deflected toward the bottom of the screen as shown in the figure, and in the opposite sense when the deflection is toward the top.

Although I prefer to utilize scanning currents of saw-tooth wave form, it is to be noted that since both deflecting and focusing fields vary in accordance with the same current and at the same time, the wave form is of no moment in determining the coincidence of the focal plane and that of the screen 14.

It is obvious that other means than the one shown may be taken to introduce a longitudinal alternating component of magnetic flux. Thus the coils 17 and 18 need carry only direct current, and the plane of the coil 23 may be tilted with respect to the axis of the oscillight tube, so that a component of their field coincides with the axis of the tube. Various other ways of accomplishing the same results will occur to those skilled in the art.

A variant system, one which is somewhat less flexible than that just described but which has considerable practical merit is that illustrated in Figure 3.

In this modification the oscillight elements are preferably so alined that the axis of the tube passes through the edge of the screen farthest from the electron gun, and the longitudinal focusing coils are positioned to establish their field parallel to this axis. The alinement of the electron gun is, of course, a desirable but not a necessary condition, since the normal or undeflected path of the rays will follow the focusing field.

The deflecting coils carry a direct as well as an alternating current component, so that their field comprises unidirectional pulses only instead of reversing in direction, any deflection of the field being toward the lower edge of the screen, as shown in the drawing.

Under these conditions the angle of deflection at any instant will be $\tan^{-1}(\phi_T/\phi_L)$. The strength of the total or resultant field will be $$\sqrt{\phi_T^2+\phi_L^2}=\phi,$$

and the focal distance will be proportional to $$\frac{1}{\phi}$$

If the width of the screen be so proportioned with respect to its obliquity that for full deflection $L/L'=\phi/\phi_L$, where L is the length of the longest path from the electron gun to the screen and L' the shortest path, the focus of the cathode ray beam will be substantially in the plane of the screen. It is true that the locus of the focal points is hyperbolic, but for the relatively small arc of the hyperbola which is used, its deviation from linearity is negligible, and the depth of the magnetic focus is ample to accommodate for the deviation. In the first form described the focal surface is a more complex curve, but here too the deviation from linearity is too small to be of moment unless an excessive degree of deflection is used.

Maximum flexibility in tube design and most favorable operating characteristics are probably obtained by a combination of the first and second methods. The connections are either as shown in Fig. 2, or separate coils are used for the direct and alternating components of the longitudinal fields. Both forms of saw-tooth wave generators described in my above mentioned copending applications normally provide the direct current component in the deflecting fields, and hence no additional source for these components is necessary.

Owing to the high voltage utilized in generating the cathode ray beam, and to the fact that it is the bombarded side of the screen 14 which is under observation, an image of great brilliancy is produced, which may be projected by the lens system 27 upon a screen 28. In practice I have utilized an apparatus in which the active portion of screen 14 is about two inches square. With this tube, utilizing 10,000 volts on the anode, a projected image two feet square has been produced which is visible in a completely darkened room, while a one foot square image gives satisfactory illumination and detail when the screen 28 is shielded from direct illumination from other sources.

Although the amount of current required to operate the oscillight is only of the order of ½ milliampere, and the source of anode potential preferably is made of so small a capacity that little excess current can be furnished thereby, nonetheless, because of the high potential of the tube, it is desirable that the operator of the apparatus be fully protected from shock. I have accomplished this by mounting the socket 46 for receiving the tube upon the oblique face 47 of a completely enclosed sheet metal container 48. The shield 13 extends into this container, and terminal 15 connects with a spring contact 50, the latter in turn being connected to the high potential source 45. In this manner complete safety is assured.

I claim:

1. A system for projecting television images and the like comprising a cathode ray tube having means for generating a pencil of cathode rays, a screen sesitive to bombardment by said rays arranged within the tube obliquely with respect to said pencil of rays, means for focusing said pencil of rays to form a minute spot on said screen, means for deflecting said pencil, and means for altering the distance from said generating means at which said pencil is focused in consonance with said deflection to maintain the focus substantially in the plane of the oblique screen.

2. A system for projecting television images and the like comprising a cathode ray tube having means for generating a pencil of cathode rays, a screen sensitive to bombardment by said rays arranged within the tube obliquely with respect to said pencil of rays, means for focusing said pencil of rays to form a minute spot on said screen, means for deflecting said pencil, means for altering the distance from said generating means at which said pencil is focused in consonance with said deflection to maintain the focus substantially in the plane of the oblique screen, and means for forming an optical image of said screen.

3. In combination with an apparatus for producing a beam of cathode rays, means for focusing said rays to produce an electrical image of their source at a distance therefrom, means for deflecting said rays, and means for altering the effect of said focusing means in consonance with the deflection of said rays to correct aberrations of the focal surface due to deflection.

4. In combination with an apparatus for producing a beam of cathode rays, a screen for receiving said rays whose various portions are at different distances from the source of said rays, and non-uniform focusing means for producing an electrical image of the source of said rays at a focal distance which varies substantially as the distance of said portions of the screen from said source.

5. In combination with an apparatus for producing a beam of cathods rays, means for producing a magnetic field longitudinal to the axis of said rays for focusing the rays to an electrical image of their source, and means for varying said field to vary the focal distance from said source of various ray paths.

6. In combination with an apparatus for producing a beam of cathods rays, means for producing a magnetic field longitudinal to the normal path of said rays, means for producing a varying magnetic field transverse to said normal path, and means for varying said longitudinal field synchronously with said transverse field to alter the focal distance of said rays in consonance with their deflection.

7. The method of focusing a beam of electrons upon a surface having elementary areas at various distances from the source of said beam which comprises passing said beam longitudinally through a magnetic field and varying the strength and direction of said field concordantly to cause the beam to focus at a distance from the source which varies with the direction of the beam substantially as the distance of said surface varies with direction.

8. The method of maintaining a beam of cathode rays in focus substantially in the plane of a surface across which they are deflected, which comprises the steps of establishing a magnetic field oblique with respect to said surface, directing the beam of rays longitudinally through said field against the edge of said surface more distant from the source of said rays, and magnetically deflecting said beam across said surface toward the edge nearer to said source with a field so proportioned to said first field that the resultant of the two fields increases in strength with the decrease in length of the path of the beam to maintain said beam substantially in focus on said surface throughout said deflection.

9. The method of focusing a beam of cathode rays upon a substantially flat surface which comprises establishing fields of force longitudinal and transverse respectively as referred to the undeflected path of said rays, passing the rays through the resultant field, and varying the intensity of said fields concurrently to produce a resultant field whose intensity varies with its direction to focus the beam of rays substantially in the plane of said surface.

10. The method of focusing a beam of cathode rays upon a substantially flat surface which comprises directing said beam to fall upon one edge of said surface when undeflected, establishing a longitudinal field of magnetic force for focusing said rays, establishing a transverse field of force for deflecting said rays, and varying said fields concurrently to produce a resultant field varying in direction and intensity to maintain the focus of said rays substantially coincident with said surface as it is deflected thereacross.

11. In the art of television transmission, the method of operation which comprises focusing a beam of electrons by an electromagnetic field onto electrode structure, deflecting the beam with respect to said structure by a second electromagnetic field, and varying the focusing field in a manner dependent upon the characteristic waveshape of the deflecting field.

12. In the art of television transmission, the method of operation which comprises focusing a beam of electrons by an electromagnetic field onto electrode structure, generating an electrical wave, utilizing the electrical wave to develop a second electromagnetic field, deflecting the beam with respect to said structure by a second electromagnetic field, and utilizing the generated electrical wave to control the electromagnetic focusing field.

13. The combination with electron apparatus of the character described comprising a tube, electrodes supported in said tube in spaced relation with respect to each other, said apparatus being characterized by the fact that in operation a beam of electrons is developed at one of said electrodes and is directed at the other electrode, electromagnetic means for focusing said beam with respect to said other electrode, and electromagnetic means for deflecting said beam in scanning fashion with respect to said other electrode; of means controlled by said deflecting means and operating in turn to control the focusing action of said first-named electro-magnetic means in such manner that during deflection the focus of the electrons at a fixed zone at said other electrode is maintained.

14. In the art of television, the method of operation which comprises normally focusing a beam of electrons onto electrode structure, deflecting the beam with respect to said structure by a deflecting field, and varying the focus of the beam at a rate of the order of the rate of deflection of the beam.

15. In a television system, scanning apparatus comprising an electrode, means for developing a stream of electrons, means for developing a magnetic field to focus the electron stream with respect to said electrode, means for deflecting the electron stream with respect to said electrode, and means for varying the focusing field in accordance with the deflection of the electron stream.

PHILO T. FARNSWORTH.